(12) United States Patent
Böhnke

(10) Patent No.: US 10,737,200 B2
(45) Date of Patent: Aug. 11, 2020

(54) METHOD FOR OPERATING A FILTER PRESS AND A FILTER PRESS

(71) Applicant: OUTOTEC (FINLAND) OY, Espoo (FI)

(72) Inventor: Bernd Böhnke, Düsseldorf (DE)

(73) Assignee: OUTOTEC (FINLAND) OY, Espoo (FI)

(*) Notice: Subject to any disclaimer, the term of this patent is extended or adjusted under 35 U.S.C. 154(b) by 0 days.

(21) Appl. No.: 16/793,000

(22) Filed: Feb. 18, 2020

(65) Prior Publication Data
US 2020/0179830 A1    Jun. 11, 2020

Related U.S. Application Data

(63) Continuation of application No. PCT/FI2017/050593, filed on Aug. 23, 2017.

(51) Int. Cl.
B01D 25/12    (2006.01)
B01D 29/84    (2006.01)
B01D 29/82    (2006.01)

(52) U.S. Cl.
CPC ......... *B01D 25/124* (2013.01); *B01D 25/125* (2013.01); *B01D 29/822* (2013.01); *B01D 29/843* (2013.01)

(58) Field of Classification Search
None
See application file for complete search history.

(56) References Cited

U.S. PATENT DOCUMENTS 3,098,429 A    7/1963    Hagglund
3,289,845 A    12/1966   Weber

FOREIGN PATENT DOCUMENTS

CN    102225258 B    7/2013
GB    2091575 A      8/1982

OTHER PUBLICATIONS

International Search Report issued by the Finnish Paetnt and Registration Office acting as the International Searching Authority in relation to International Application No. PCT/FI2017/050593 dated Feb. 9, 2018 (6 pages).
Written Opinion of the International Searching Authority issued by the Finnish Paetnt and Registration Office acting as the International Searching Authority in relation to International Application No. PCT/FI2017/050593 dated Feb. 9, 2018 (8 pages).
International Preliminary Report on Patentability issued by the European Paetnt Office acting as the International Preliminary Examining Authority in relation to International Application No. PCT/FI2017/050593 dated Jul. 31, 2019 (5 pages).

*Primary Examiner* — Bradley R Spies
(74) *Attorney, Agent, or Firm* — Robert P. Michal, Esq.; Carter, DeLuca & Farrell LLP

(57) ABSTRACT

A method of operating a filter press, wherein filter material is fed into a filter chamber so as to form a filter cake between at least two sides of a flexible said filter medium. Filtrate is received from the filter chamber and the filter cake formed the filter chamber is discharged. Prior to discharging the filter cake, compression is applied on the filter cake formed within the filter chamber by providing compression fluid gas at a compression pressure exceeding a prevailing pressure within the filter chamber, directly on a side of the filter medium exterior to the filter chamber, so as to exert said compression pressure directly on said side of the filter medium, thereby causing the filter medium to yield against the filter cake.

20 Claims, 4 Drawing Sheets

METHOD FOR OPERATING A FILTER PRESS AND A FILTER PRESS

CROSS-REFERENCE TO RELATED APPLICATIONS

This application is a continuation of PCT International Application No. PCT/FI2017/050593 filed Aug. 23, 2017, the disclosure of this application is expressly incorporated herein by reference in its entirety.

FIELD OF THE DISCLOSURE

The present disclosure relates to a method of operating a filter press.

BACKGROUND OF THE DISCLOSURE

Conventional filter presses are well known in the art. Commonly, a filter press comprises a filter chamber into which filter material, such as slurry, is fed. The solids content of the filter material is separated from the liquid contents thereof by a filter medium, such as a liquid permeable filter cloth. The liquid portion is recovered from the filter chamber via a drainage arrangement, whereas the solids content forms filter cake within the filter chamber.

To further extract liquid content form the filter cake, it is often squeezed by diaphragm or membrane element, compressed against the filter cake using fluid pressure. Such a membrane or diaphragm have conventionally been sealed elements in the sense that the fluid used for exerting a pressure is contained within the diaphragm or membrane.

Moreover, an airflow is often induced through the filter medium and/or filter cake for further extracting any remaining liquid portion therefrom.

Such arrangements provide good results in extracting the liquid contents of the filter material, but requires a complex structure and introduces additional components which are subject to wear, and thus, additional maintenance.

BRIEF DESCRIPTION OF THE DISCLOSURE

An object of the present disclosure is to provide a method for operating a filter press and a filter press enabling a more simple and robust construction.

The objects of the disclosure are achieved by a method and filter press which are characterized by what is stated in the independent Claims. The preferred embodiments of the disclosure are disclosed in the dependent claims.

The disclosure is based on providing a compression gas at a compression pressure on a side of the filter medium external to the filter chamber such that the filter medium itself yields towards the filter chamber and compresses the filter cake, thus extracting residual liquid content from the filter cake. This eliminates the need for a separate membrane or diaphragm element.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
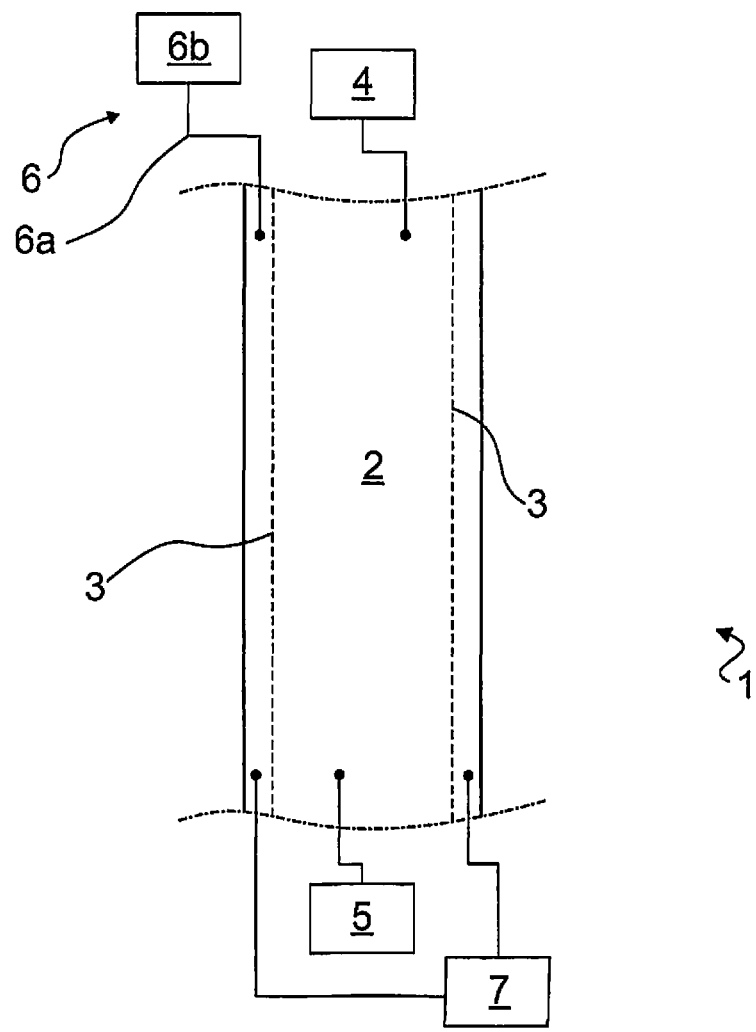
FIG. 1 schematically illustrates a cut view of a filter press according to an embodiment of the present disclosure, in which filtrate is drained from both sides of the filter chamber, as seen from the side.

According to a first aspect of the present disclosure, a method of operating a filter press 1 is provided. In the method, filter material is fed into a filter chamber 2 so as to separate filtrate from solids with a flexible filter medium 3, and to form a filter cake within the filter chamber 2 between at least two sides of said filter medium. As the filter medium 3 has at least two sides, filtrate may suitably be received through said at least sides during feeding of filter material Filtrate is received from the filter chamber 2 through the filter medium 3. That is, filtrate is collected, drained and passed further on. Thereafter, the filter cake formed within the filter chamber 2 is discharge therefrom.

The method further comprises, prior to discharging the filter cake, applying compression on the filter cake formed within the filter chamber 2. This is done by providing compression gas directly on a side of the filter medium 3 exterior to the filter chamber 2, so as to exert a compression pressure directly on said side of the filter medium. The compression gas is provided at a compression pressure exceeding a prevailing pressure within the filter chamber 2, thereby causing the filter medium 3 to yield against the filter cake. This enables residual filtrate to be removed from the filter cake by squeezing, without a separate membrane of diaphragm element. Moreover, the filtrate drained during compression may still be received through another side of the at least two sides of the filter element 3. Therefore, the method enables a more robust and reliable filter press construction, as less components subject to wear and maintenance are required. Preferably, but not necessarily, air is used as the compression medium.

Preferably, but not necessarily, the filter material is fed at a feed pressure, which is maintained within the filter chamber 2 at least until the compression pressure is achieved on the side of the filter medium 3 exterior to the filter chamber. This ensures that sudden pressure changes, which might crack the filter cake, are avoided. Any cracks in the filter cake may result in the compression gas flowing via said crack, which in turn results in excessively high local flow velocities potentially damaging the filter medium 3 itself. Hence, robustness and reliability is further improved.

Suitably, the feed pressure does not exceed the compression pressure. This ensures, that the pressure prevailing within the filter chamber does not need to be decreased prior to applying the compression pressure. For example, a feed pressure of 4-10 bar may be used.

Preferably, but not necessarily, compression gas is provided on a side of the filter medium 3 exterior to the filter chamber 2 at least until a compression gas flow through the filter medium 3 and the filter cake is achieved. This enables further the reduction of additional components, as separate blow drying are no longer required. Again, a more robust and reliable filter press construction is enabled, as less components subject to wear and maintenance are required.

Suitably, the compression pressure exceeds the pressure prevailing in the filter chamber 2 by at least 1 bar, preferably by 2-6 bar, more preferably by 3-5, and most preferably by 4 bar. Such pressure differentials have been found to sufficient ability to remove residual filtrate, while minimizing the risk of damaging the filter medium 3. This further contributes to providing a more robust and reliable filter press construction.

According to an embodiment of the first aspect, the compression gas is provided on opposite sides of the filter chamber 3, preferably alternatingly. That is, the filter cake may be compressed form opposite sides, either simultaneously or in an alternating sequence.

This is advantageous in certain application, in which the filter cake repositioned inside the filter chamber for facilitating cake drying or cake discharge, for example.

The method described in connection with the present disclosure may be implemented on any type of filter press equipped suitable compression means, as discussed later on in connection with the second aspect of the present disclosure. Particularly, filter presses having horizontal or vertical filter chambers may be used for implementing the method.

According to an embodiment of the first aspect, the method described above may be implemented such that opposing filter plates forming the filter chamber 2 are held stationary with respect to each other during the whole of the filtration cycle, including discharge of the filter cake. This is as opposed to conventional type of filter presses, in which opposite filter plates are retracted away from each other during cake discharge.

Preferably, but not necessarily, the filter cake is discharged from the filter chamber 2 by opening a closing member of the discharge arrangement 5, said closing member being configured to selectively open or close a discharge opening of the filter press. Such an arrangement is particularly suitable in connection with filter presses having filter plates held stationary during the whole filtration cycle.

The filtration method discussed above may be used for filtering filter materials of any kind. Preferably, but not necessarily, various slurries from mining operations are filtered. For example, the method is particularly suitable for use in filtering tailings, or slurry resulting from bulk mining, such as slurry containing iron ore content, phosphate ore content, or apatite ore content.

According to a second aspect of the present disclosure, a filter press 1 is provided. The filter press comprises a filter chamber 2 configured for receiving filter material to be filtered.

A flexible filter medium 3 having at least two sides is provided within said filter chamber. The filter medium 3 is configured for receiving filter material to be filtered between the at least two sides, so as to separate filtrate from solids of said filter material by filtration.

A feed arrangement 4 is provided, comprising a filter material supply and a filter material floe route. The feed arrangement 4 is configured to feed filter material to the filter chamber 2 to be filtered therein by the filter medium 3, thereby forming a filter cake within the filter chamber, between the at least two sides of the filter medium 3.

A drainage arrangement 7 is provided, being configured to receive filtrate from the filter chamber 2 through the filter medium 3. The drainage arrangement is preferably further configured to conduct the filtrate further on.

A discharge arrangement 5 is provided, being configured for discharging the filter cake formed within the filter chamber.

The filter press 1 further comprises a compression arrangement 6. The compression arrangement has a compression gas flow route 6a for enabling fluid communication for a compression gas form a compression gas supply 6b to directly a side of the filter medium 3, exterior to the filter chamber. The compression arrangement 6 also has a compression gas supply 6b for providing, via the compression gas flow route 6a, compression gas directly to the side of the filter medium 3, exterior to the filter chamber 2.

Furthermore, the compression arrangement 6 is configured to provide compression gas directly on a side of the filter medium 3, exterior to the filter chamber, so as to exert a compression pressure directly on said side of the filter medium. Particularly, the compression gas is provided at a compression pressure exceeding a prevailing pressure within the filter chamber 2, thereby causing the filter medium 3 to yield against the filter cake.

Such an arrangement enables residual filtrate to be removed from the filter cake by squeezing, without a separate membrane of diaphragm element. Therefore, a filter press of such a construction is more robust and, as less components subject to wear and maintenance are required.

Preferably, but not necessarily, air is used as the compression gas.

Preferably, but not necessarily, the feed arrangement 4 is further configured to feed the filter material at a feed pressure. Moreover, the feed pressure is suitably maintained within the filter chamber 2 at least until the compression pressure is achieved on the side of the filter medium 3 exterior to the filter chamber 2. This ensures that sudden pressure changes, which might crack the filter cake, are avoided. Any cracks in the filter cake may result in the compression gas flowing via said crack, which in turn results in excessively high local flow velocities potentially damaging the filter medium 3 itself. Hence, robustness and reliability is further improved.

Suitably, the feed pressure does not exceed the compression pressure. This ensures, that the pressure prevailing within the filter chamber does not need to be decreased prior to applying the compression pressure. For example, a feed pressure of 4-10 bar may be used.

Preferably, but not necessarily, the compression arrangement 6 is further configured to provide compression gas on the side of the filter medium 3 exterior to the filter chamber 2 at least until a compression gas flow through the filter medium 3 and the filter cake is achieved. This enables further the reduction of additional components, as separate blow drying, or depending on the application, cake washing components are no longer required. Again, a more robust and reliable filter press construction is enabled, as less components subject to wear and maintenance are required.

Suitably the feed arrangement 4 and the compression arrangement 6 are further arranged such that the compression pressure exceeds the pressure prevailing in the filter chamber by at least 1 bar, preferably by 2-6 bar, more preferably by 3-5, and most preferably by 4 bar. Such pressure differentials have been found to sufficient ability to remove residual filtrate, while minimizing the risk of damaging the filter medium 3. This further contributes to providing a more robust and reliable filter press construction.

According to an embodiment of the second aspect, the compression arrangement 6 is further configured to provide compression gas on opposite sides of the filter chamber 3, preferably alternatingly. This enables that the filter cake may be compressed form opposite sides, either simultaneously or in an alternating sequence. Suitably, this may be done configuring the compression gas flow route 6a to selectively provide fluid communication between the compression gas supply 6b and both of the opposing exterior sides of the filter medium 3.

The filter press according to the second aspect may be provided as any type of filter press. Particularly, the filter press 1 may be provided with horizontal or vertical filter chambers 3.

Preferably, but not necessarily, the drainage arrangement 7 comprises a drainage flow route for conducting filtrate, the drainage flow route being a separate entity from the compression gas flow route 6a.

According to an embodiment of the second aspect, the filter chamber 2 may be horizontal, and formed by an upper filter plate and a lower filter plate one above the other. In such a case, the filter plates are retractable away from each other for filter cake discharge. Moreover, the filter medium 3 comprises an upper side fixed to the upper filter plate and a lower side movable with respect to the lower filter plate for filter cake discharge.

Further in such a configuration the compression gas flow route 6a is configured for enabling fluid communication for a compression gas form a compression gas supply 6b directly to the upper side of the filter medium 3 exterior to the filter chamber. Respectively, the drainage arrangement 7 is configured in connection with the lower filter plate, so as to receive filtrate from the filter chamber 2 through the lower side of filter medium 3.

Suitably, the filter press is configured such that the filter chamber 2 is formed by opposing filter plates held stationary with respect to each other during the whole of the filtration cycle, including discharge of filter cake. That is, the opposing filter plates remain stationary during normal operation and are retracted away from each other only during maintenance service or repair. This is as opposed to conventional type of filter presses, in which opposite filter plates are retracted away from each other during cake discharge.

Preferably, but not necessarily, the discharge arrangement 5 further comprises a closing member, said closing member being configured to selectively open or close a discharge opening of the filter press for discharging a filter cake formed within the filter chamber 2. For example, the closing member may be provided as one or more inflatable hoses, which, when inflated, close and seal a discharge opening of the filter chamber 2. When deflated, such an inflatable hose opens up said discharge opening and allow the filter cake to be removed from the filter chamber 2.

Suitably, the filter medium used in the filter press is of a conventional filter cloth type. Depending on the construction of the filter press, the filter medium may comprise one or two separate filter sheets, preferably filter cloth. For example, a filter press equipped with two-sided filtrate collection, i.e. on both sides of the filter chamber, is preferably equipped with two separate filter sheets, while a filter press of the single-sided construction is preferably equipped with a single filter sheet. Moreover, filter presses of the type having stationary filter plates are preferably equipped with a filter medium element defining at least partially a closed circumference.

FIG. 1 schematically illustrates a cut view of a filter press 1 according to an embodiment of the present disclosure, in which filtrate is drained from both sides of the filter chamber 2, as seen from the side. During the filtration cycle, the feed arrangement 4 feeds filter material into the filter chamber 2. In a known fashion, the filter media 3 on both sides of the filter chamber 2 is permeable to the liquid contents of the filter material. Consequently, the drainage arrangement 7, also on both sides of the filter chamber 2, receives and drains the liquid content of the filter material, while the solid content is retained within the filter chamber 2, thus forming a filter cake therein. The discharge arrangement 5 is configured for discharging the filter cake from the filter chamber 2.

Moreover, the filter press of FIG. 1 is equipped with a compression arrangement 6 having a compression gas flow route 6a for enabling fluid communication for a compression gas form a compression gas supply 6b to a side of the filter medium 3 exterior to the filter chamber 2. The compression arrangement further comprises a compression gas supply 6b for providing, via the compression gas flow route 6a, compression gas to the side of the filter medium 3 exterior to the filter chamber 2. Preferably, but not necessarily, compressed air is used as the compression gas.

Figure 2:
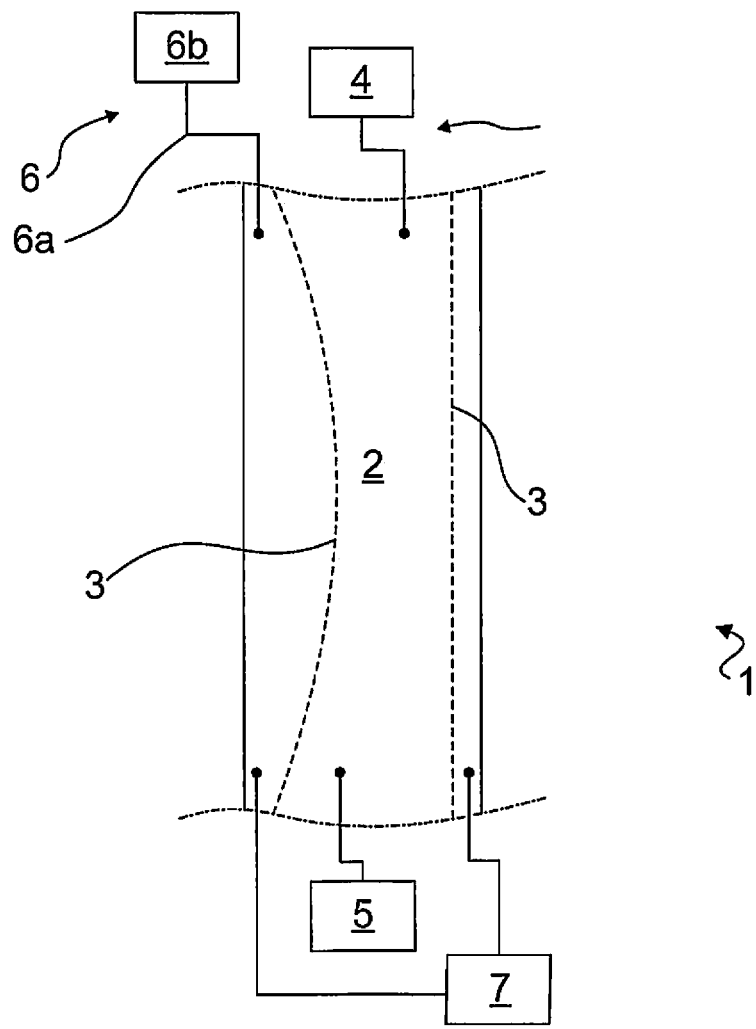
FIG. 2 schematically illustrates a cut view of the filter press of FIG. 1, in a situation in which compression gas is introduced to an exterior side of the filter medium so as to compress the filter cake, as seen from the side.

FIG. 2 illustrates the filter press of FIG. 1 in a situation, where the compression arrangement 6 is used to remove residual liquid content from the filter cake. Namely, in order to further remove residual liquid content from the filter cake before discharging it from the filter chamber, the compression arrangement 6 may provide compression gas on a side of the filter medium 3 exterior to the filter chamber. As this compression gas is provided at a compression pressure exceeding a prevailing pressure within the filter chamber 2, a compression is exerted directly on said side of the filter medium (3), thereby causing the filter medium to yield against the filter cake. This, in turn, squeezes the filter cake, further separating liquid content therefrom. The residual liquid content removed by squeezing is drained by the drainage arrangement 7 on a side the filter chamber 2 opposite to the compression arrangement 6.

Moreover, residual liquid may be even further removed from the filter cake by allowing the compression gas to permeate through the filter medium and the filter cake so as to induce a gas flow therethrough. Such an airflow will convey residual liquid particle from the filter cake.

Figure 3:
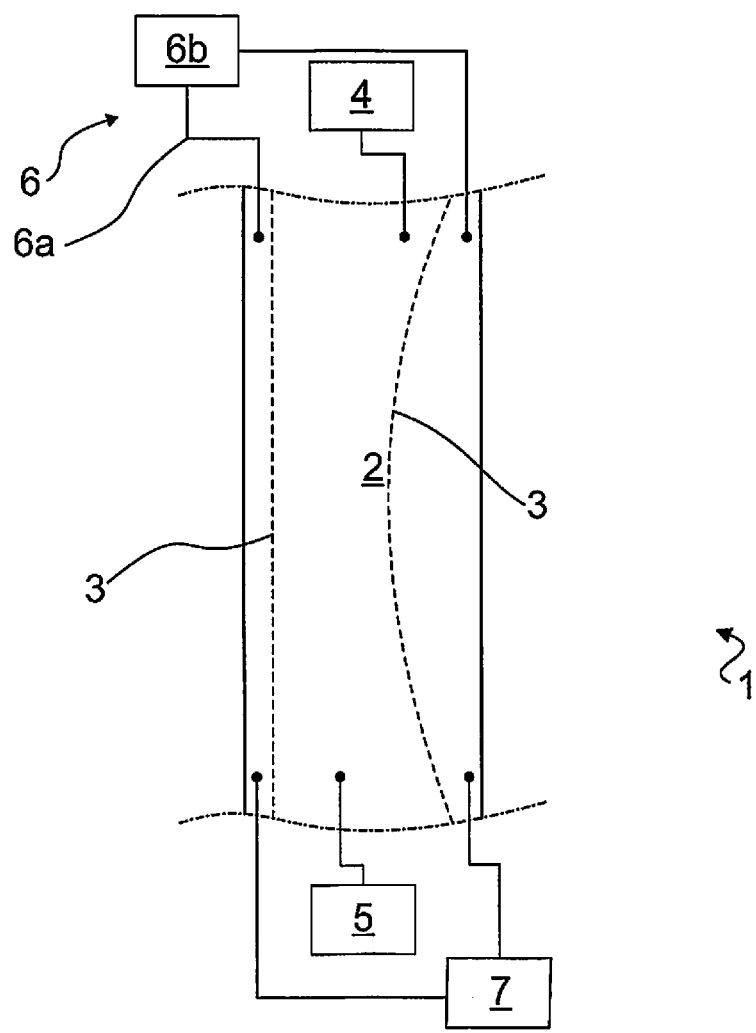
FIG. 3 schematically illustrates a cut view of the filter press of FIG. 2, in a situation in which compression gas is alternatingly introduced to an opposite exterior side of the filter medium so as to compress the filter cake, as seen from the side, and FIG. 4 schematically illustrates a cut view of a filter press according to an embodiment of the present disclosure, in which filtrate is drained from both sides of the filter chamber, as seen from the side.

FIG. 3 illustrates an alternative construction of a filter press according to the present disclosure. Particularly, the compression arrangement 6 is equipped with a flow route 6a for both opposing exterior sides of the filter medium 3, thus enabling compression to be applied to the filter cake from either side of the filter chamber 2. This enables compression to be the filter cake from both sides of the filter chamber 2 either simultaneously or alternatingly. As opposed to FIG. 2, FIG. 3 illustrates a situation in which compression gas is led to an opposite side of the filter chamber.

Figure 4:
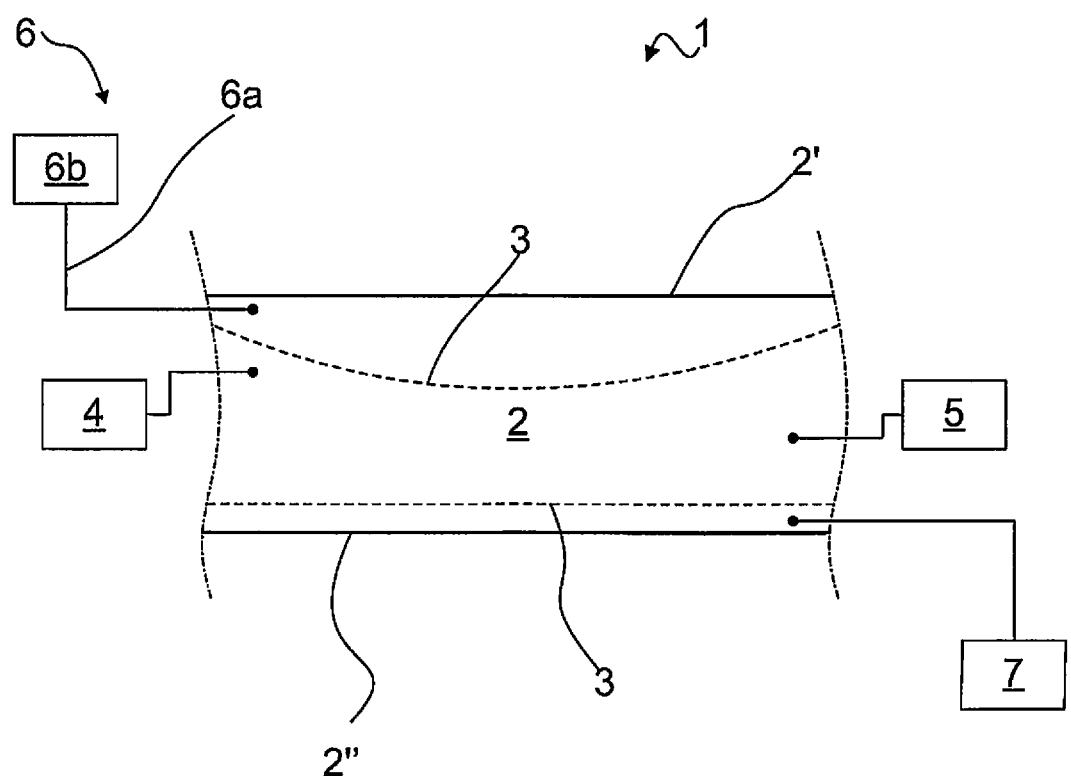

FIG. 4 illustrates another alternative construction of a filter press 1 according to the present disclosure. Particularly, the filter chamber 2 is horizontal, and formed by an upper filter plate 2' and a lower filter plate 2' one above the other; said filter plates being retractable away from each other for filter cake discharge. An upper side of the filter medium is fixed to the upper filter plate 2', while a lower side is movable with respect to the lower filter plate 2" for filter cake discharge. Moreover, the compression gas flow route 6a is configured for enabling fluid communication for a compression gas form a compression gas supply 6b directly to the upper side of the filter medium 3 exterior to the filter chamber. Respectively; the drainage arrangement 7 is configured in connection with the lower filter plate 2", so as to receive filtrate from the filter chamber 2 through the lower side of filter medium 3. The discharge arrangement 5 suitably comprises means for retracting the upper filter plate 2' and the lower filter plate 2" away from each other, in addition to mean for moving the lower side of the filter medium 3 away from between the plates 2',2" along with the filter cake formed on top of the lower side.

Although the disclosure has been discussed above in connection with a single filter chamber, it should be understood that, naturally, multiple filter chambers may be provided in a filter press.

The invention claimed is:

1. A method of operating a filter press, comprising the steps of:
   feeding filter material into a filter chamber at a feed pressure so as to separate filtrate from solids with a flexible filter medium, and to form a filter cake within said filter chamber between at least two sides of said filter medium,
   receiving filtrate from the filter chamber via the filter medium,
   discharging the filter cake formed within the filter chamber, and
   prior to discharging the filter cake, applying compression on the filter cake formed within the filter chamber by providing compression gas at a compression pressure exceeding a prevailing pressure within the filter chamber, directly on a side of the filter medium exterior to the filter chamber, so as to exert said compression pressure directly on said side of the filter medium, thereby causing the filter medium to yield against the filter cake,
   wherein the feed pressure is maintained within the filter chamber at least until the compression pressure is achieved on the side of the filter medium exterior to the filter chamber.

2. The method according to claim 1, wherein the compression gas is provided on the side of the filter medium exterior to the filter chamber at least until a compression gas flow through the filter medium and the filter cake is achieved.

3. The method according to claim 1, wherein the compression pressure exceeds the pressure prevailing in the filter chamber by at least 1 bar.

4. The method according to claim 1, wherein the compression gas is alternatingly provided on opposite sides of the filter chamber.

5. The method according to claim 1, wherein the filter chamber is formed by opposing filter plates held stationary with respect to each other during the whole of the filtration cycle, including discharge of the filter cake.

6. The method according to claim 5, wherein the filter cake is discharged from the filter chamber by opening a closing member of the discharge arrangement, said closing member being configured to selectively open or close a discharge opening of the filter press.

7. The method according to claim 1, wherein the filter material is tailings.

8. The method according to claim 1, wherein the filter material is slurry resulting from bulk mining, such as slurry containing iron ore content, phosphate ore content, or apatite ore content.

9. A filter press, comprising:
   a filter chamber configured for receiving filter material to be filtered;
   a flexible filter medium having at least two sides, said filter medium being positioned within said filter chamber, and configured for receiving filter material to be filtered between the at least two sides, so as to separate filtrate from solids of said filter material by filtration;
   a feed arrangement comprising:
   a filter material supply, and
   a filter material flow route,
   the feed arrangement being configured to feed filter material at a feed pressure from a filter material supply to the filter chamber to be filtered therein by the filter medium, thereby forming a filter cake within the filter chamber, between the at least two sides of the filter medium;
   a drainage arrangement configured to receive filtrate from the filter chamber through the filter medium;
   a discharge arrangement for discharging the filter cake formed within the filter chamber;
   a compression arrangement having:
   a compression gas flow route for enabling fluid communication for a compression gas form a compression gas supply directly to a side of the filter medium, exterior to the filter chamber, and
   a compression gas supply for providing, via the compression gas flow route, compression gas to directly a side of the filter medium exterior to the filter chamber,
   a compression gas control means for selectively enabling or disabling gas flow from the compression gas supply via the compression gas flow route,
   wherein the compression arrangement is configured to provide compression gas at a compression pressure exceeding a prevailing pressure within the filter chamber, directly on a side of the filter medium exterior to the filter chamber, so as to exert said compression pressure directly on said side of the filter medium, thereby causing the filter medium to yield against the filter cake,
   wherein feed arrangement being further configured to maintain said feed pressure within the filter chamber at least until the compression pressure is achieved on the side of the filter medium exterior to the filter chamber
   wherein the filter chamber is horizontal, and formed by an upper filter plate and a lower filter plate one above the other, said filter plates being retractable away from each other for filter cake discharge,
   the filter medium comprising:
   an upper side fixed to the upper filter plate and
   a lower side movable with respect to the lower filter plate for filter cake discharge.

10. The filter press according to claim 9, wherein the compression arrangement is further configured to:
    provide compression gas on the side of the filter medium exterior to the filter chamber at least until a compression gas flow through the filter medium and the filter cake is achieved.

11. The filter press according to claim 9, wherein the feed arrangement and the compression arrangement are further arranged such that the compression pressure exceeds the pressure prevailing in the filter chamber by at least 1 bar.

12. The filter press according to claim 9, wherein the compression arrangement is further configured to provide compression gas alternatingly on opposite sides of the filter chamber.

13. The filter press according to claim 9, wherein the drainage arrangement comprises drainage flow route for conducting filtrate, wherein said drainage flow route is a separate entity from the compression gas flow route.

14. The filter press according to claim 9, wherein
    wherein the compression gas flow route is configured for enabling fluid communication for a compression gas form a compression gas supply directly to the upper side of the filter medium exterior to the filter chamber, and wherein the drainage arrangement is configured in connection with the lower filter plate, so as to receive filtrate from the filter chamber through the lower side of filter medium.

15. The method according to claim 3, wherein the compression pressure exceeds the pressure prevailing in the filter chamber by 2-6 bar.

16. The method according to claim 3, wherein the compression pressure exceeds the pressure prevailing in the filter chamber by 3-5 bar.

17. The method according to claim 3, wherein the compression pressure exceeds the pressure prevailing in the filter chamber by 4 bar.

18. The filter press according to claim 11, wherein the feed arrangement and the compression arrangement are further arranged such that the compression pressure exceeds the pressure prevailing in the filter chamber by 2-6 bar.

19. The filter press according to claim 9, wherein the feed arrangement and the compression arrangement are further arranged such that the compression pressure exceeds the pressure prevailing in the filter chamber 3-5.

20. The filter press according to claim 9, wherein the feed arrangement and the compression arrangement are further arranged such that the compression pressure exceeds the pressure prevailing in the filter chamber by 4 bar.

* * * * *